June 27, 1933.　　　　　L. T. SMITH　　　　　1,915,388
METHOD OF SEPARATING BORNEOL FROM PINE OIL
Filed Aug. 11, 1927
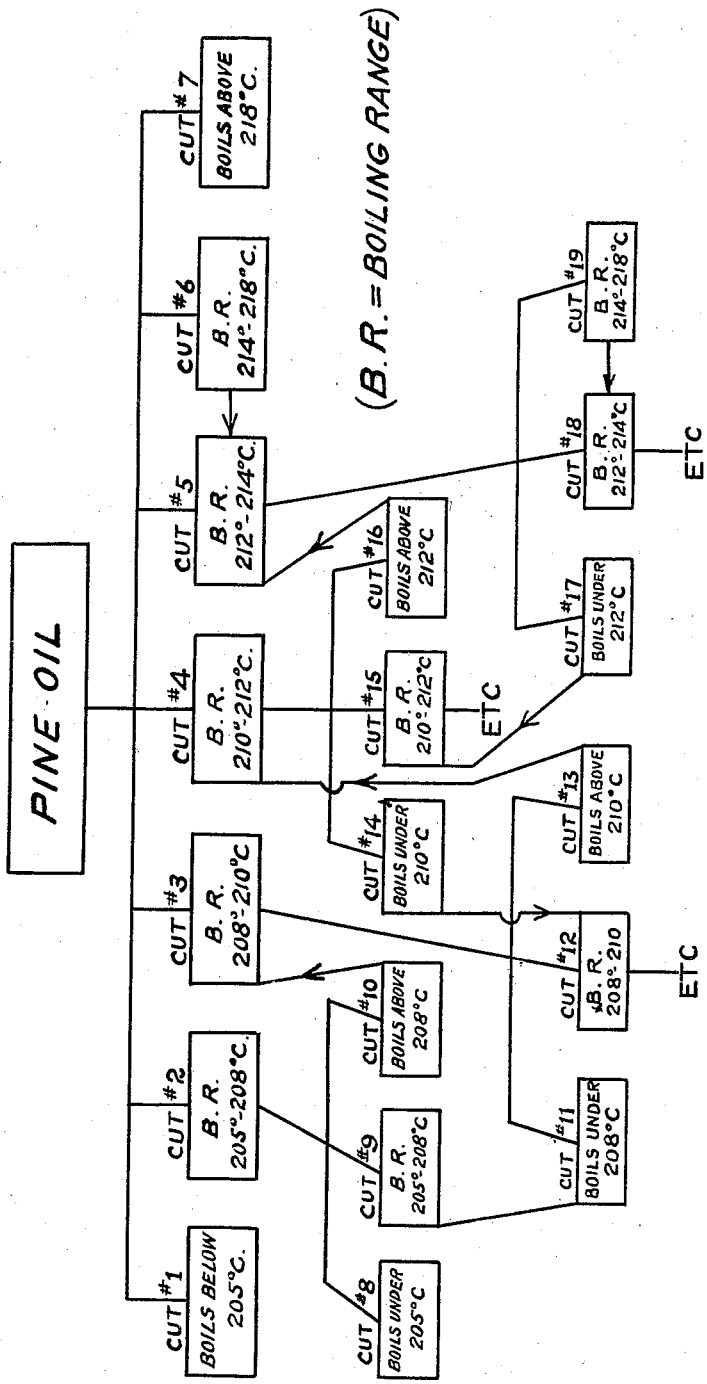
INVENTOR
Lee T. Smith Patented June 27, 1933

1,915,388

UNITED STATES PATENT OFFICE

LEE T. SMITH, OF KENVIL, NEW JERSEY, ASSIGNOR TO HERCULES POWDER COMPANY, OF WILMINGTON, DELAWARE, A CORPORATION OF DELAWARE

METHOD OF SEPARATING BORNEOL FROM PINE OIL

Application filed August 11, 1927. Serial No. 212,300.

My invention relates to a method for the separation of borneol from pine oil.

Heretofore borneol having a boiling point of about 212° C. and a melting point of about 206° C. has been recognized as a constituent of pine oil.

Borneol, which finds its principal use in connection with the making of camphor, is found in nature and has been separated from pine oil, but heretofore only by methods involving the chemical treatment of the pine oil, distillation of the treated pine oil and treatment of the residue for the separation therefrom of the borneol. The recovery of borneol from the residue of chemically treated pine oil is relatively expensive and the yield of borneol is relatively small.

Now, it is the object of my invention to provide a method whereby borneol may be separated from pine oil without the necessity for chemical treatment of the pine oil, and whereby a relatively large yield may be obtained at a minimum of expense.

According to my invention I have discovered that borneol is highly soluble in terpineol, especially alpha-terpineol, a constituent of pine oil and that this solubility in the terpineol prevents the effective separation of the borneol from the pine oil by methods heretofore practiced, such as by fractionation. According to my invention from the broad standpoint, I fractionate pine oil to obtain a fraction relatively rich in borneol and then separate from the fraction the alpha-terpineol in which the fraction is substantially rich and in which, as has been indicated, the borneol is soluble, since the boiling points of terpineol and borneol are relatively close. After separation of the alpha-terpineol, which may be caused to crystallize and may then be separated out, I have discovered that the borneol may be separated from the fraction in solid form and relatively pure with little difficulty.

According to the method embodying my invention, for example, pine oil, such as is derived from pine wood by any well known method, is fractionated and a cut or fraction boiling within the range from about 205° C.–220° C. separated. Preferably, a fraction boiling within the narrower range from about 214° C. to about 216° C. is separated and the alpha-terpineol, a constituent of the pine oil and contained in the cut, separated out. The alpha-terpineol may be separated out, for example, by refrigerating the cut, or seeding the cut with a crystal of alpha-terpineol to effect crystallization of the alpha-terpineol, or otherwise inducing crystallization as by mechanical means, as adding a small piece of glass, a grain of sand or the like, and enabling its separation by filtration or centrifugation.

After separation of the crystallized alpha-terpineol, which as has been indicated, may be separated by filtration or centrifugation, the mother liquor is refractionated to obtain cuts rich in borneol which are cooled to effect precipitation of borneol. Borneol freezes at about 206° C., but it is preferable that the cuts rich in borneol obtained from the refractionation of the mother liquor be cooled to substantially below 0° C. in order to facilitate solidifying of the borneol. The cuts rich in borneol obtained from the refractionation of the mother liquor, after they have been cooled, may be seeded to facilitate solidification of the borneol or solidification of the borneol may be induced by mechanical means. The solidified borneol is separated from its mother liquor by filtration or centrifugation.

As a further example of the carrying out of the method embodying my invention and with reference to the accompanying drawing in which is shown a flow sheet, the pine oil may be initially fractionated into, for example, cuts numbered 1–7 on the accompanying drawing. Cuts #1 and #7 are set aside while cut #6 is treated for the crystallization therefrom of alpha-terpineol, which may be effected, for example, by refrigeration, seeding, or mechanical means and the crystallized alpha-terpineol is separated by filtration or centrifugation. The mother liquor from cut #6 is then added to cut #5.

Cut #2 is refrationated into cuts numbered 8, 9 and 10 on the accompanying drawing. Cut #8 is set aside, while cut #10 is added to cut #3, which is then refractionated into cuts numbered 11, 12 and 13 on the accompanying drawing. Cut #11 is added to cut #9, while cut #13 is added to cut #4, which is then refractionated to cuts numbered 14, 15 and 16 on the accompanying drawing. Cut #14 is added to cut #12, while cut #16 is added to the combination of cut #5 and the mother liquor of cut #6 obtained after the removal of crystallized alpha-terpineol therefrom. Cut #5, to which, as is clear, has been added cut #16 and the mother liquor of cut #6, is then refractionated into cuts numbered 17, 18 and 19 on the accompanying drawing. Cut #17 is added to cut #15, while cut #19 is treated as by refrigeration, seeding or mechanical means to effect crystallization of alpha-terpineol therefrom, which is separated from the mother liquor by filtration or centrifugation and the mother liquor added to cut #18. Cuts #9, #12, #15 and #18 are respectively refractionated.

Borneol is separated from the several cuts and from the cuts from which the alpha-terpineol has been separated by first effecting crystallization of the borneol as by refrigeration, seeding or mechanical means and then effecting its separation by filtration or centrifugation.

It will be understood that additional fractions of the original pine oil or of the several cuts obtained by refractionation and of the mother liquors obtained after separation of alpha-terpineol may be made, it being the object of my invention to effect by fractionation and refractionation the concentration of borneol and then effect the removal of alpha-terpineol from the concentrated cuts which, as will be understod, is concentrated with the borneol and in which the borneol is so soluble as to prevent its recovery until after the removal of the alpha-terpineol, which I have discovered may be readily removed enabling subsequent ready recovery of the borneol by effecting its crystallization.

It will now be observed that by virtue of my invention a method of substantial simplicity and economy is provided for the separation of borneol from pine oil and by the practice of which borneol is recovered in desirable form and in a state of substantial purity.

In connection with the separation of borneol, it should be noted that according to my invention the pine oil is fractionated to obtain a concentration of borneol, and the alpha-terpineol which is to a substantial extent also concentrated and in which the borneol is soluble is then eliminated by crystallization, thus releasing the borneol from solution in the alpha-terpineol and rendering its release from solution in the mother liquor comparatively simple. The practicability of the process according to my invention depends upon the discovery that while the borneol is highly soluble in alpha-terpineol, it is sufficiently soluble in the mother liquor so that it will not crystallize out with the alpha-terpineol and that when the alpha-terpineol is removed from the mother liquor, as by crystallization, the borneol will readily separate after further fractionation from the mother liquor by cooling sufficiently to cause it to freeze or solidify, though it will be understood that crystallization of the borneol may be effected after cooling the mother liquor by seeding, or induced by mechanical means.

It will be understood that the fractionation and refractionation of the pine oil and of the several cuts may be carried out with or without steam and under ordinary atmospheric pressure or under reduced pressure. Effecting the fractionations under reduced pressure is desirable, since lower temperature may be used with less decomposition and polymerization and with the recovery of products possessing a more pleasant odor and probably more nearly pure.

It will be understood that the carrying out of my invention as described herein specifically with reference to the accompanying drawing is by way of example only and shall not be taken as limiting my invention in its broader aspect.

Having now fully described my invention, what I claim and desire to protect by Letters Patent is:—

1. The method of separating borneol from pine oil, which includes fractionating the pine oil to obtain a cut rich in borneol and terpineol and which will boil at normal atmospheric pressure largely within the range about 205° C.–220° C., crystallizing terpineol present in the cut separating the crystallized terpineol from the mother liquor fractionating the mother liquor to obtain cuts rich in borneol and effecting crystallization of borneol from cuts rich in borneol obtained from the mother liquor.

2. The method of separating borneol from pine oil, which includes fractionating the pine oil to obtain a cut boiling at normal atmospheric pressure largely within the range about 214° C.–216° C., effecting crystallization of alpha-terpineol from the cut, separating the crystallized alpha-terpineol from the mother liquor fractionating the mother liquor to obtain cuts rich in borneol and effecting the crystallization of borneol from cuts rich in borneol obtained from the mother liquor.

3. The method of separating borneol from pine oil, which includes fractionating the pine oil to obtain a cut boiling within the range about 205° C.–220° C., effecting crystallization of terpineol from the cut, filtering out the crystallized terpineol, refractionating the filtrate to obtain a plurality of cuts, effecting the crystallization of borneol from cuts of the filtrate which are rich in borneol, separating out the crystallized borneol and fractionating the mother liquor to obtain cuts relatively rich in borneol and effecting crystallization of additional borneol from cuts relatively rich in borneol obtained from the mother liquor.

In testimony of which invention, I have hereunto set my hand, at Kenvil, New Jersey, on this 1st day of August, 1927.

LEE T. SMITH.